June 24, 1930. S. I. PRESCOTT 1,765,848

DISHED WHEEL

Filed Sept. 16, 1927

INVENTOR
Sydney I. Prescott

Patented June 24, 1930

1,765,848

UNITED STATES PATENT OFFICE

SYDNEY I. PRESCOTT, OF NEW YORK, N. Y.

DISHED WHEEL

Application filed September 16, 1927. Serial No. 219,896.

This invention relates to an improvement in dished wheels, particularly those designed for use on motor cars.

In some wheel constructions, the main load-carrying wheel bearing is housed within the inboard end of the hub, while in others it is housed in the axle housing close to but not within the inboard end of the hub. The present idea of means contemplates a straight-line load support or load line intersecting the plane of rotation of the wheel at the central point of wheel and ground contact, and intersecting the wheel axis at a point adjacent the inboard end of the hub and the main load-carrying bearing, but its exact location may be varied somewhat in accordance with the type of axle used. The main object of the invention is the production of a wheel embodying this idea and comprising, generally, a hub, a body and fastening means therefor carried by said hub, a rim and fastening means therefor carried by said body, and a tire carried by said rim, said body and said fastening means being substantially on said load line when directly under the hub, and not subject to stresses other than those essential to its load-carrying function under road conditions. This is made possible by employment of the load line referred to, there being no necessity in such case for a radially resilient wheel construction. Other objects of the invention reside in improvements in wheel parts used in carrying the invention into effect. With these and other objects not specifically mentioned in view, the invention consists in certain constructions and combinations which will be hereinafter fully described and then specifically set forth in the claims hereunto appended.

Figure 1:
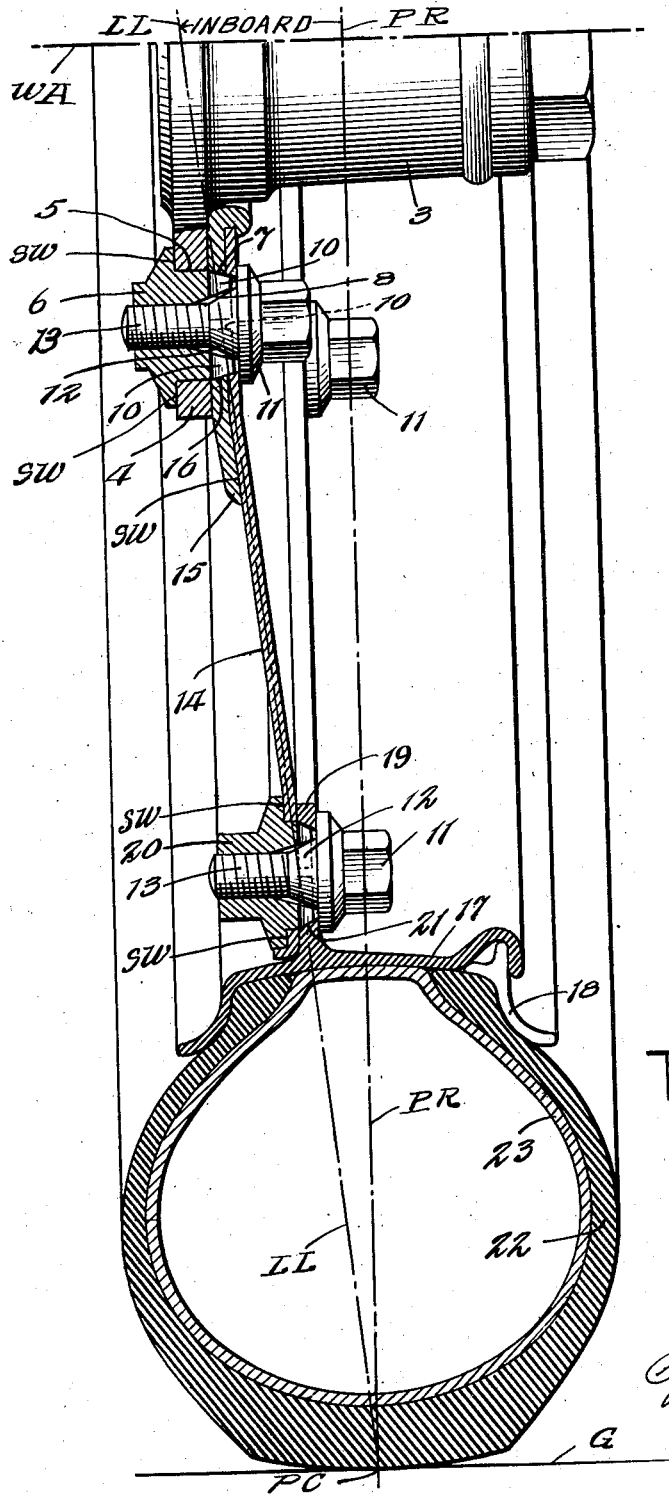
Figure 2:
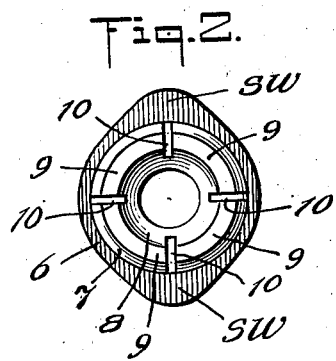

In the accompanying drawings, in which like characters of reference indicate the same or like parts, Fig. 1 is a cross-sectional view of the lower half of a dished wheel constructed in accordance with the invention; and Fig. 2 is an end view of one of the fastening nuts shown in Fig. 1.

In carrying the invention into effect, there is provided a dished wheel having the characteristics hereinbefore pointed out. In the best constructions contemplated, the fastening means is self-locking and serves to center and support the body and the rim, the former on the hub, and the latter on the body; the body is demountable from the hub; the rim is of the quick-detachable type and demountable from the body; the tire is demountable from the rim without demounting the latter; the hub and rim are provided with flanges to which the body is connected by the fastening means; and the fastening means includes expansion-nuts in fixed position and removable coacting expansion-screws. Any or all of the above mentioned parts may be widely varied in construction within the scope of the claims, for the specific structure selected to illustrate the invention is but one of many possible concrete embodiments of the same. The invention, therefore, is not to be restricted to the precise details of the structure shown and described.

Referring to the drawings: The line G indicates the ground. The broken line WA indicates the wheel axis. The broken line PR indicates the plane of rotation of the wheel. The point PC indicates the central point of wheel and ground contact. The broken line LL indicates the load line which lies inboard from the plane of rotation at the wheel axis, adjacent the inboard end of the hub and the main bearing of the wheel. The reference characters SW indicate spot welds, although other means may be employed for fixedly uniting the parts indicated as welded.

The specific wheel shown includes a hub 3 which is provided with an integral flange 4 close to its inboard end and intersected by the load line LL at and adjacent to the wheel axis WA. The hub flange 4 is provided with a series of holes 5 in each of which is snugly fitted a nut 6 forming a part of fastening means whereby a body is demountably secured to the hub flange 4. Each nut 6 is or may be spot welded to the flange as indicated in Fig. 1. It projects outboard beyond the hole 5; and its projecting end is provided with an externally tapered surface 7, and with an internally tapered surface 8. The projecting end of the nut is further split into segments 9 by means of diametral slots 10. Coacting with each nut 6 is a flanged-head expansion-screw 11 having a conical section 12 and a threaded section 13, the latter engaging the thread of the nut 6. The conical section 12 engages the internally tapered surface 8 of each segment 9 of the nut, and when the screw is tightened, it tends to slightly expand those segments, for a purpose which will appear presently. The set of nuts 6 and screws 11, carried by the hub flange 4, constitute fastening means whereby a body is demountably secured to the hub. The number of body fastening devices may be varied, but an odd number, as five, is preferred as an aid to vibration control. And it may be here remarked that the angularity of the surfaces 7, 8 and 12 is somewhat exaggerated in the drawings, in the interest of clearness.

The wheel body shown includes an annular disc 14 provided with an annular reinforcing plate 15 the inner perimeter of which is swaged over the inner perimeter of the disc, and the outer perimeter of which is spot welded to the disc. The body 14—15 is provided with a number of holes 16 corresponding to the number of fastening devices used to secure it to the hub. These holes 16 are tapered to fit the externally tapered surfaces 7 of the nuts 6; and this construction enables the operator, when mounting the body on the flange, to easily slip the body into proper position or center it with the walls of the holes 16 engaging the nut surfaces 7. Then, when the screws 11 are tightened, and the nut segments are slightly expanded thereby, the latter become tightly jammed in the holes 16, and the entire fastening means becomes securely locked against accidental release.

At its outer perimeter, the disc 14 carries a demountable and quick-detachable rim 17 having a removable split ring 18 and an integral flange 19, the latter resting on the rim fastening means. This rim is transversely arched on a radius from the central point of wheel and ground contact, as well as circumferentially, and is therefore exceptionally strong and needs no supporting felloe. To demountably secure the rim to the disc 14, a series of nuts 20 and screws 11 are carried by the body. The nuts 20 are like the nuts 6 except in dimensions, and the screws 11 are or may be identical with the screws of the body fastening means. The operation of the rim fastening means is the same as that of the body fastening means, the rim flange 19 being provided with tapered holes 21 similar to the tapered holes 16 of the body.

Mounted on the rim 17 is a tire comprising a shoe 22 and an inner tube 23 of the usual construction and operation, except that since the wheel has no felloe and the rim at the plane of rotation is thin, a very short and light valve stem and cap may be fitted to the inner tube 23.

By an inspection of Fig. 1, and in view of the foregoing, it will be understood that the load line LL intersects both flanges 4 and 19, the fastening devices 6—11 and 20—11, and passes radially through the lower part of the disc 14 of the body 14—15, so that always there is load-supporting metal all along the load line LL from the main bearing of the wheel to the cushioning tire 22—23, in a straight and therefore the shortest possible line. It is to be understood also that the almost flat conicity of the body 14—15, and its location with respect to the load line, and the location of the fastening devices on or substantially on that line, results in a wheel having ample strength, both radially and laterally, coupled with light weight and freedom from stresses other than those essential to load-carrying under road conditions.

What is claimed is:

1. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub.

2. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub, the point of intersection of said load line and said wheel axis being close to the inboard end of said hub.

3. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub, and said body fastening means having conical members centering and supporting said body.

4. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub, and said rim fastening means having conical members centering and supporting said rim.

5. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub, and said fastening means centering and supporting said body and said rim.

6. A dished wheel having an inclined load line intersecting its plane of rotation at the central point of wheel and ground contact and intersecting the wheel axis at a point inboard from said plane, comprising a hub, a body and fastening means therefor carried by said hub, a rim and fastening means therefor carried by said body, and a tire carried by said rim, said body and said fastening means being substantially on said load line when directly under the hub, and said hub and said rim each having a flange intersected by said load line, and said fastening means connecting said body and flanges.

7. In a wheel, the combination with a hub having a flange provided with lateral threaded apertures and laterally projecting body supports internally and externally tapered and divided into expansible segments, of a body having tapered holes fitting the external taper of said supports to cause said supports to center and support said body, and screws having flanged heads engaging the outboard side of said body and having tapered sections engaging the internal taper of said supports and having threaded sections engaging the threads of said apertures and operating to expand said segments to demountably lock said body on said flange.

8. In a wheel, the combination with a body provided with lateral threaded apertures and laterally projecting rim supports internally and externally tapered and divided into expansible segments, of a rim having a flange provided with tapered holes fitting the external taper of said supports to cause said supports to center and support said rim, and screws having flanged heads engaging the outboard side of said flange and having tapered sections engaging the internal taper of said supports and having threaded sections engaging the threads of said apertures and operating to expand said segments to demountably lock said rim on said body.

In testimony whereof, I have signed my name to this specification.

SYDNEY I. PRESCOTT.